Patented June 16, 1942

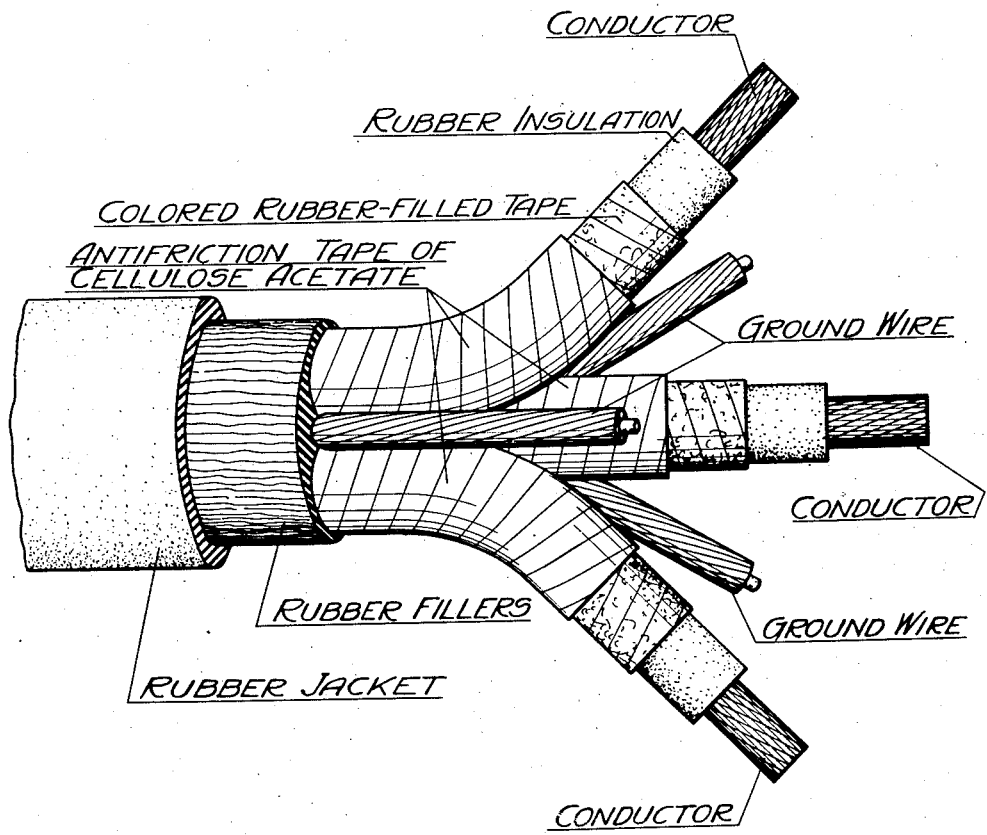

2,286,826

UNITED STATES PATENT OFFICE 2,286,826

PORTABLE POWER CABLE

James J. Morrison, Worcester, Mass., assignor to The American Steel and Wire Company of New Jersey, a corporation of New Jersey Application August 1, 1940, Serial No. 349,192

2 Claims. (Cl. 174—116)

This is a continuation-in-part of my application filed September 29, 1936 and bearing Serial No. 103,193. The invention is a portable power cable using rubber fillers yet having a flexibility comparable to that obtained by the use of jute or other fibrous fillers.

A portable cable is understood by those skilled in the art to mean a three or four conductor cable used in mines, quarries, etc. to power electric shovels, dredges, cranes and similar electric equipment. It works under high potential, which sometimes exceeds 4500 volts, it must be flexible to permit its continual reeling and unreeling on and off drums, and it must be comparatively light in weight yet sufficiently tough and durable to withstand the severest usage. It is dragged over rocks and rough ground, exposed to the elements at all seasons, yet must continue to give uninterrupted service.

The customary way to make a portable power cable is with stranded copper conductors which are tinned and covered by rubber insulation, the interstices between the rubber insulations being provided with fillers to smooth out the cable contour and a vulcanized rubber jacket or belt being used to close this assembly of elements. Ground wires are usually laid in the interstices between the rubber insulations and the latter may carry electrostatic shielding if the cable is to work at extremely high potentials, such as over 4500 volts. The filler used to smooth the contour of the cable is jute or other fibrous material.

Now it has always been considered desirable to substitute rubber fillers for the jute or other fibrous fillers, the latter being objectionable in that they do not provide the firmness and elasticity or the greater resistance to impact or crushing weight afforded by rubber, they being subject to the further objection that should the jacket of the cable be cut through, water, oil, etc., which might enter, migrates along the cable so as to result in a baggy effect, and, possibly, cause rotting of the fillers.

However, the incorporation of rubber fillers in a portable power cable presents a problem in that the vulcanized rubber jacket overall presses the fillers against the insulated conductors so as to prevent their moving relative the fillers during the flexing and twisting to which a portable power cable is subjected during service, and the normal practice of vulcanizing rubber fillers after assembly caused them to adhere to the rubber conductor insulations so as to increase the trouble. Efforts have been made to preform and prevulcanize the rubber fillers, to coat the insulated conductors with lubricating material, such as talcum, graphite, etc., all without any definite gain in flexibility although with a great increase in cost. Prior to the present invention the problem of providing a portable power cable with rubber fillers remained unsolved, the fillers used being all jute or other material.

According to the present invention, the above problem is solved by placing a layer of regenerated cellulose or cellulose acetate around each of the rubber insulated conductors so as to provide antifriction surfaces for aiding the required sliding of the rubber insulated conductors relative the rubber fillers. If shielding is used, the antifriction layer may be placed either between the rubber insulation and the shielding or between the shielding and the rubber fillers. One, two or more antifriction layers may be used in any event, due consideration being had for cable enlargement, two layers producing a more flexible product than one layer. In the commercial form of the invention the layer is now formed by winding thin cellulose acetate tape over the rubber insulation with the convolution edges slightly overlapping.

It has been found that either regenerated cellulose, such as the commercially available "Cellophane," or cellulose acetate, are both practically unaffected by the heat necessary to effect vulcanization of the rubber fillers and the rubber jacket, so the fillers can be assembled and vulcanized without sticking to any of the insulated conductor assemblies which must slide relative the fillers. Furthermore, these materials are not acted upon by the chemical ingredients in rubber compounds or other types of insulation, and they are practically impervious to oil, asphalt, or other materials commonly used in the manufacture of electric cable. Furthermore, due to their inherent characteristics they can be provided with different colors so as to aid in conductor identification during cable insulation work.

In addition to the two materials specifically mentioned, it is conceivable that other materials may be used providing they are resistant to the heat necessary to effect vulcanization of the fillers and jacket, are resistant to the chemicals commonly encountered in cable constructions and present glassy, slippery surfaces to the relatively sliding cable elements. This is mentioned because of the rapid progress now being made in materials having the characteristics of regenerated cellulose and cellulose acetate, but it is to be understood that oiled or calendered paper and many other materials may prove unsuitable for the use now under discussion, since the material used must have the characteristics mentioned.

The accompanying drawing illustrates the commercialized form of the invention by way of providing the required specific example of the same. Since this drawing carries legends indicating the various elements of the cable, it is unnecessary to further describe the same in view of what has already been said. However, before closing, it should be understood that the rubber components are actually rubber compound and that they may be made of artificial rubber, the term "rubber" being used to cover either of these.

I claim:

1. An electric cable of the portable type including a plurality of conductors, at least one layer of material immovably fixed over each of said conductors, rubber fillers for smoothing the cable contour, a jacket covering all said elements and pressing them toward one another, and a layer of regenerated cellulose or cellulose acetate arranged between said material and said fillers to provide antifriction surfaces for aiding the required sliding of the former relative the latter necessary for cable flexibility.

2. A portable power cable comprising a plurality of conductors, rubber insulation over each of said conductors, rubber fillers for smoothing the cable contour, a rubber jacket pressing said fillers and said insulation together, the insulation being substantially immovable relative to said conductors, and at least one layer of flexible tape wound around the insulation of each of said conductors, said tape being resistant to the heat necessary to effect vulcanization of said jacket and to chemicals commonly encountered in cable constructions and presenting slippery surfaces to said insulation and said fillers, said surfaces having the physical characteristics of surfaces provided by regenerated cellulose or cellulose acetate.

JAMES J. MORRISON.